United States Patent [19]

Matsuura

[11] Patent Number: 5,530,860
[45] Date of Patent: Jun. 25, 1996

[54] VIRTUAL COMPUTER CONTROL SYSTEM EFFECTIVELY USING A CPU WITH PREDETERMINED ASSIGNMENT RATIOS OF RESOURCES BASED ON A FIRST AND SECOND PRIORITY MECHANISM

[75] Inventor: Hidekazu Matsuura, Kawasaki, Japan

[73] Assignee: Fujitsu Limited, Kawasaki, Japan

[21] Appl. No.: 61,055

[22] Filed: May 14, 1993

[30] Foreign Application Priority Data

May 15, 1992 [JP] Japan .................. 4-122985

[51] Int. Cl.$^6$ .................. G06F 9/00
[52] U.S. Cl. .................. 395/650; 364/230.1; 364/230.3; 364/230; 364/DIG. 1
[58] Field of Search .................. 395/200, 295, 395/425, 650

[56] References Cited

U.S. PATENT DOCUMENTS

| | | | |
|---|---|---|---|
| 3,648,253 | 3/1972 | Mullery et al. | 395/650 |
| 4,481,583 | 11/1984 | Mueller | 395/725 |
| 4,916,608 | 4/1990 | Shultz | 395/650 |
| 5,109,512 | 4/1992 | Bahr et al. | 395/650 |
| 5,157,657 | 10/1992 | Potter et al. | 370/85 |
| 5,231,633 | 7/1993 | Hluchyj et al. | 370/94.1 |

*Primary Examiner*—Thomas C Lee
*Assistant Examiner*—Sang Hui Kim
*Attorney, Agent, or Firm*—Staas & Halsey

[57] ABSTRACT

The system of controlling CPUs in a virtual computer system in which virtual computers are operated by assigning CPU resources to a plurality of virtual computers (guest VMs) according to optional ratios aims at effectively utilizing actual CPUs with predetermined assignment ratios duly maintained even if the CPU assignment ratios are unequally set among a plurality of guest VMs. The present invention comprises an operation counter for storing the number of times of operations in which each guest VM is successfully assigned CPU resources according to a predetermined assignment ratio, and an assignment order control unit for arranging pointer information on guest VMs in order of number of times of operations indicated by the operation counter, the pointer information being arranged in the ready queue where the current priority in the CPU resource assignment is set using the pointer information on each VM, and for arranging the pointer information on guest VMs in high-to-low order of assignment ratio for those which indicate the same number of times of operations.

19 Claims, 12 Drawing Sheets

| NAME OF VM | ACTUAL ASSIGNMENT RATIO | SPECIFIED ASSIGNMENT RATIO |
|---|---|---|
| VM1 | 78 | 80 |
| VM2 | 78 | 80 |
| VM3 | 28 | 30 |
| VM4 | 7 | 5 |
| VM5 | 7 | 5 |

VIRTUAL COMPUTER CONTROL SYSTEM EFFECTIVELY USING A CPU WITH PREDETERMINED ASSIGNMENT RATIOS OF RESOURCES BASED ON A FIRST AND SECOND PRIORITY MECHANISM

BACKGROUND OF THE INVENTION

Field of the Invention

The present invention relates to a CPU (central processing unit) control system for use in a virtual computer system operated by a control program capable of running a plurality of virtual computers in an actual computer provided with a plurality of CPUs, and more specifically to a CPU control system for use in a virtual computer system for running a plurality of virtual computers by allocating them CPU resources according to a desired assignment.

One of the most utilized computer technologies is a virtual computer system capable of running a plurality of virtual computers (hereinafter referred to as "guest VMs") in an actual computer using a control program CP named "a virtual computer monitor program (VM monitor)", and also capable of operating each of the guest VMs with an operating system OS.

With such a virtual computer system, a plurality of guest VMs can be operated by a plurality of CPUs by determining the assignment (ratio) of CPU resources to each of the guest VMs so as to effectively utilize the capabilities of the CPUs by the guest VMs and sequentially run the guest VMs according to assignment ratios. The guest VMs are allowed to run in high-to-low order of assignment ratio.

However, when the resources are not equally assigned to the guest VMs, those assigned a smaller amount of the CPU resources are operated more frequently as the running operation is repeatedly performed. As a result, the CPU resources are not assigned as desired, and should be optimally adjusted.

DESCRIPTION OF THE RELATED ART

FIG. 1 shows a conventional virtual computer system capable of operating a plurality of guest VM13-1 through VM13-n according to a control program (CP) 11 in an actual computer provided with an actual CPU 12. Guest VM 13-1 through VM13-n can individually use the operating system OS.

At this time, the actual computer system is provided with a single CPU 12, assigns the actual CPU 12 to each of the guest VM 13-1 through VM13-n based on a predetermined assignment ratio, and runs them sequentially.

The control program 11 is assigned a process control block PCB 14 as a CPU assignment information area for storing a CPU resource assignment ratio predetermined for each of the guest VM13-1 through VM13-n.

The order of running guest VM13-1 through VM13-n is determined by a ready queue 15. In the ready queue 15, the order of assigning CPU resources to guest VM13-1 through VM13-n is initialized in high-to-low order of assignment ratio. The ready queue 15 stores the pointer information designating an information area in the control process block 14 for each of the guest VM13-1 through VM13-n based on the priority determined by a CPU assignment ratio.

Actually, the ready queue 15 stores the current head pointer information indicating the highest priority and the current end pointer information indicating the lowest priority.

Therefore, the control program 11 obtains the name of the guest VM to be assigned CPU resources and its assignment ratio by referring to the process control block 14 specified by the head pointer in the ready queue 15, and allows the actual CPU 12 to run the OS for the selected guest VM for the time determined on the basis of the assignment ratio.

FIG. 2 is a flowchart for explaining the assignment to virtual computers shown in FIG. 1. First, in step S1, pointer information on guest VM13-1 through VM13-n stored in the ready queue 15 is arranged according to the order determined on the basis of CPU assignment ratio. Thus, a guest VM is selected as designated according to the head pointer information, that is, the contents of the process control block 14.

Next, in step S2, the actual CPU 12 is assigned to the guest VM selected according to the priority provided by the ready queue 15, and the selected guest VM is operated by the actual CPU 12 for the time determined on the basis of assignment ratio.

When the assignment is released in step S2, the pointer information on the guest VM whose CPU assignment has been released is moved to the position of the end pointer information, and the second priority pointer information is moved to the position of the head pointer information in step S3, and then the next guest VM is operated back in step S1.

FIG. 3 shows the order of assigning a single actual CPU to four guest VM1, VM2, VM3, and VM4.

The assignment ratio of the CPU resources to guest VM1 through VM4 is predetermined and stored in the process control block 4 as follows.

| VM1 | 80% |
| VM2 | 10% |
| VM3 | 5% |
| VM4 | 5% |

When CPU resources are assigned to a plurality of guest VM1 through VM4 using a single actual CPU, they are assigned in high-to-low order of CPU assignment ratio as shown in FIG. 3, and are successfully assigned according to a predetermined assignment ratio and in a predetermined order.

With the conventional virtual computer system, the CPU resources can be assigned strictly according to a predetermined assignment ratio only if a single CPU 12 is available as shown in FIG. 1.

However, if there are a plurality of, for example, two actual CPUs 12-1 and 12-2 available as shown in FIG. 4, there arises the problem that the CPU resources cannot be assigned strictly according to predetermined assignment ratios.

The problem is created because the priority is determined in the ready queue 15 in high-to-low order of assignment ratio.

When a single CPU is available, the CPU resources can be assigned according to a predetermined assignment ratio by arranging the values of assignment ratio. However, if a plurality of CPUs are available, a guest VM assigned a smaller assignment ratio may be assigned the CPU resources more frequently than a guest VM assigned a larger assignment ratio. Thus, the CPU resources cannot be assigned according to predetermined assignment ratios. This is explained in detail as follows.

First, when there are two actual CPUs 12-1 and 12-2 available as shown in FIG. 4, the CPU resources can be assigned strictly on the basis of assignment ratio, as in FIG. 1 where a single actual CPU 12 is available, by assigning the CPU resources to a plurality of guest VM13-1 through VM13-n. The basis of assignment priority is determined according to assignment ratios as long as an equal assignment ratio is assigned to those guest VMs and they are assigned the actual CPUs for an equal number of times.

In FIG. 5, actual CPU 12-1 is equally assigned to guest VM 1, VM3, VMS, and VM7, while actual CPU 12-2 is equally assigned to guest VM2, VM4, VM6, and VM8. The CPU resources are assigned on the basis of priority determined in ascending order of VM numbers. In this case, processes are repeated with the CPU assignment order exactly maintained as predetermined.

However, when the CPU resources are assigned on the basis of unequal assignment ratio, a predetermined assignment order cannot be maintained as the process is repeatedly performed. In this case, the CPU resources cannot be assigned according to predetermined assignment ratios.

FIG. 6 shows the assignment of the CPU resources of two actual CPUs 12-1 and 12-2 to five guest VM1 through VM5 on the basis of unequal assignment ratio.

| VM1 | 80% |
| VM2 | 80% |
| VM3 | 30% |
| VM4 | 5% |
| VM5 | 5% |

At first, the CPU is assigned in high-to-low order of assignment ratio as follows.

VM1→VM2→VM3→VM4→VM5

First, the CPU resources of the actual CPUs 12-1 and 12-2 are assigned in the above listed order. That is, the actual CPU12-1 is assigned to guest VM1, and simultaneously the actual CPU12-2 is assigned to guest VM2. Then, a process is started. Since the individual assignment ratios of guest VM1 and VM2 is 80%, the assignment to guest VM1 and VM2 is released at the time determined by the assignment ratio of 80%.

Next, the actual CPU12-1 is assigned to guest VM3, and simultaneously the actual CPU12-2 is assigned to guest VM4. Since the assignment ratio of guest VM3 is 30% and that of guest VM4 is 5%, the assignment to guest VM4 is released earlier and the actual CPU12-2 is assigned to the last guest VM5. Thus, the first assignment cycle of the available CPU resources is completed.

Now, even though the assignment to guest VM4 and VM5 is released, guest VM3 is still being assigned the CPU resources. Therefore, guest VM4 and VM5 whose assignment is released earlier are queued in the ready queue 15.

The second assignment cycle of the CPU resources is started by assigning the actual CPU12-2 to guest VM1 after the last assignment to guest VM5 has been released in the first assignment cycle. At this time, the first assignment to guest VM3 (CPU12-1) has not been released.

When the first assignment to guest VM3 is released, the actual CPU12-1 is assigned to guest VM2, thus starting the second assignment cycle of the CPU resources.

The second assignment cycle of the CPU resources is performed in the following order on completing the first assignment to guest VM3.

VM1→VM2→VM4→VM5→VM3

Likewise, the third assignments are performed in the following order when the second assignment cycle is completed.

VM1→VM4→VM5→VM3→VM2

FIG. 7 shows in time units the assignment of the CPU resources shown in FIG. 6. In FIG. 7, the assignment of the actual CPUs 12-1 and 12-2 to guest VM1–VM5 is indicated in time units.

Thus, if the actual CPUs 12-1 and 12-2 are assigned to guest VM1–VM5 on the basis of unequal assignment ratios, then the assignment to guest VM4 and VM5 having a smaller assignment ratio is released earlier that the assignment to guest VM3 having a larger assignment ratio. Accordingly, in the following assignment, guest VM4 and VM5 are assigned the CPU earlier than guest VM3. When this process is repeatedly performed, the CPUs may not be assigned at predetermined assignment ratios.

FIG. 8 shows the actual assignment of the CPU compared with the predetermined assignment when the CPU assignment shown in FIG. 6 is repeatedly performed to reach a saturation state (performed until the actual assignment indicates the approximation of a predetermined value). In this case, the actual assignment to guest VM4 and VM5 having a smaller predetermined assignment ratio results in the increment in the CPU assignment, while the actual assignment to guest VM1–VM3 having a larger predetermined assignment ratio results in the decrement.

On the other hand, even if the CPUs are equally assigned as shown in FIG. 5, the control program 11 takes a guest VM out of the ready queue 15 and assigns the CPU to the next guest VM if the guest VM has fallen into a waiting state during operation.

When a waiting guest VM becomes operative, the control program 11 sets the operative guest VM to the position indicated by the end pointer of the ready queue 15. Thus, if a guest VM has fallen into a waiting state, the inequality in the number of CPU assignment temporarily arises and the CPUs cannot be assigned at predetermined ratios.

SUMMARY OF THE INVENTION

The present invention has been developed based on the above described background, and aims at providing a method of controlling the CPU of a virtual computer system so that an actual CPU can be effectively used with predetermined assignment ratios of CPU resources exactly maintained even though the CPU is unequally assigned.

The present invention also aims at providing a method of controlling the CPU of a virtual computer system so that an actual CPU can be effectively used with predetermined assignment ratios of CPU resources exactly maintained even though a guest VM has fallen into a waiting state during the operation performed according to an equal CPU assignment ratio.

A feature of the present invention resides in a central processing unit control system for use in a virtual computer system having an actual computer. It comprises an operation counter, provided in the central processing unit assignment information area, for storing for each virtual computer the number of times of successful assigning operations according to a predetermined CPU resource assignment ratio, and an assignment order control unit, provided in the control program, for arranging pointer information on the virtual computers in order of number of times of operations indicated by the operation counter, wherein the virtual computers are assigned CPU resources in high-to-low order of assignment ratio when a plurality of virtual computers indicate the same number of times of operations indicated by the operation counter, and the virtual computers are assigned CPU resources in order of number of times of operations when the virtual computers indicate different numbers of times of operations.

DESCRIPTION OF THE PREFERRED EMBODIMENT

Figure 1:
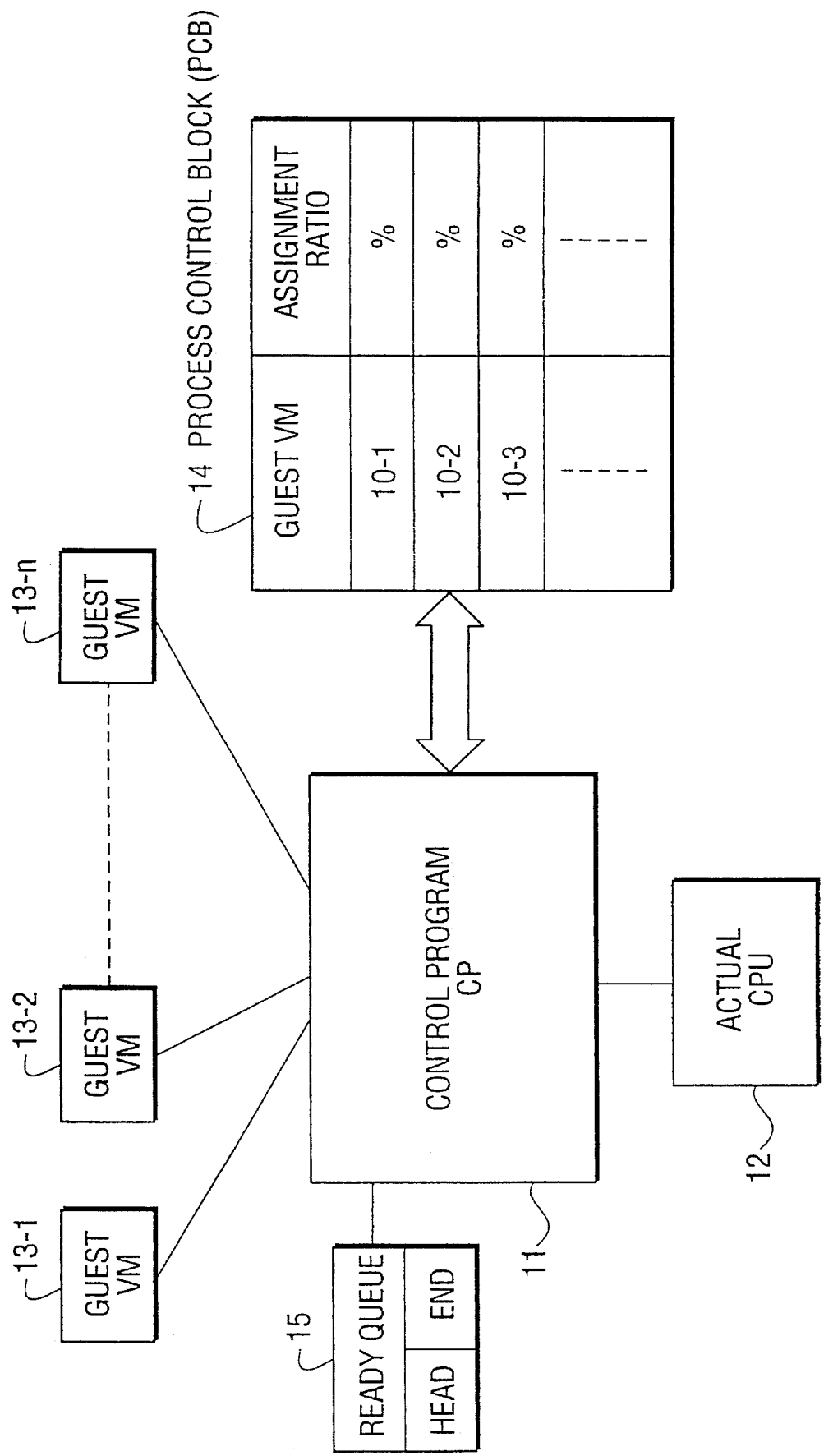
FIG. 1 shows a conventional virtual computer system using a single actual CPU.
Figure 2:
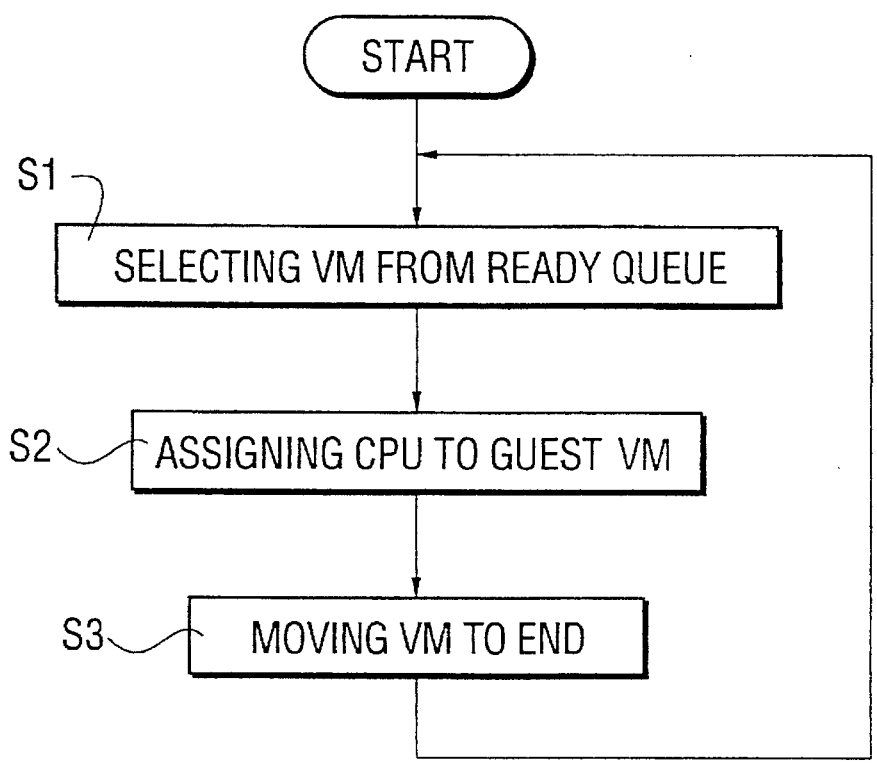
FIG. 2 is a flowchart indicating the assignment of CPU resources on a single actual CPU basis.
Figure 3:
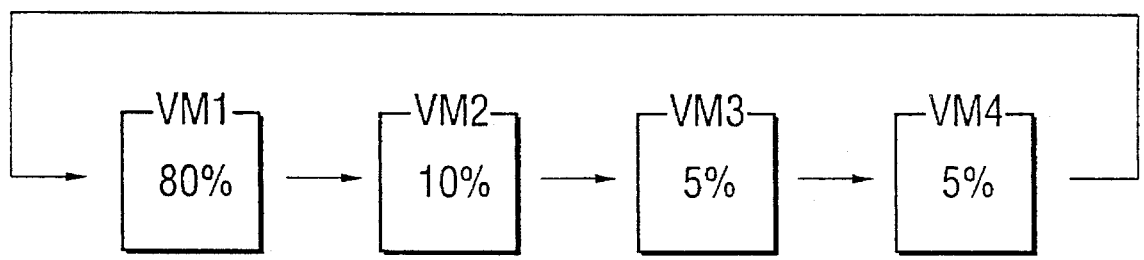
FIG. 3 shows an assignment order according to a conventional assignment ratio.
Figure 4:
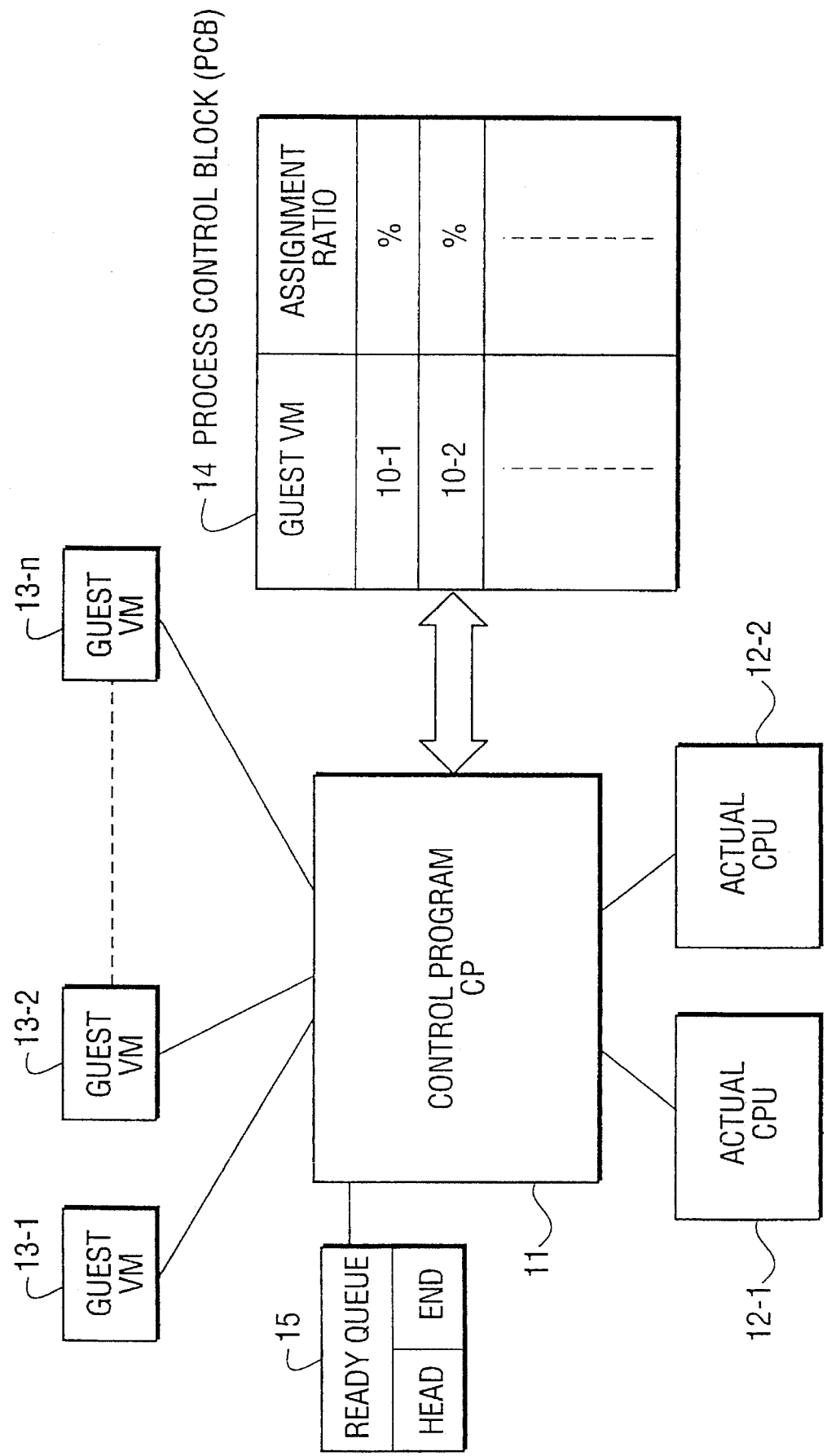
FIG. 4 shows a conventional virtual computer system using a plurality of actual CPUs.
Figure 5:
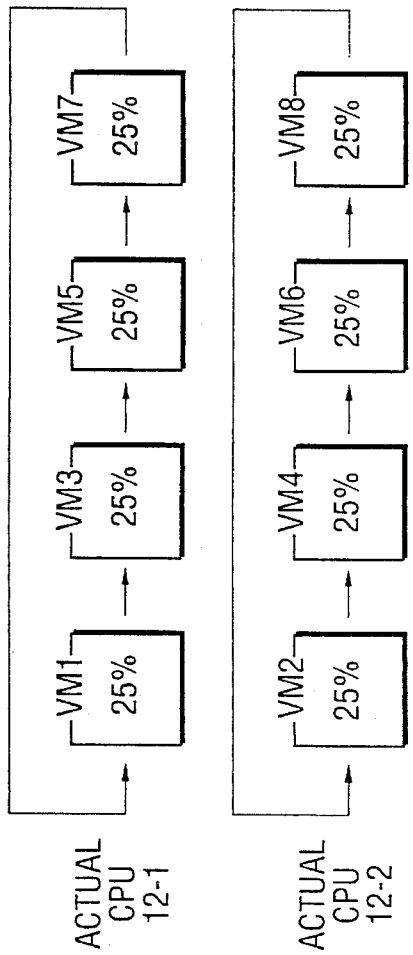
FIG. 5 shows a conventional equal assignment using a plurality of actual CPUs.
Figure 6:
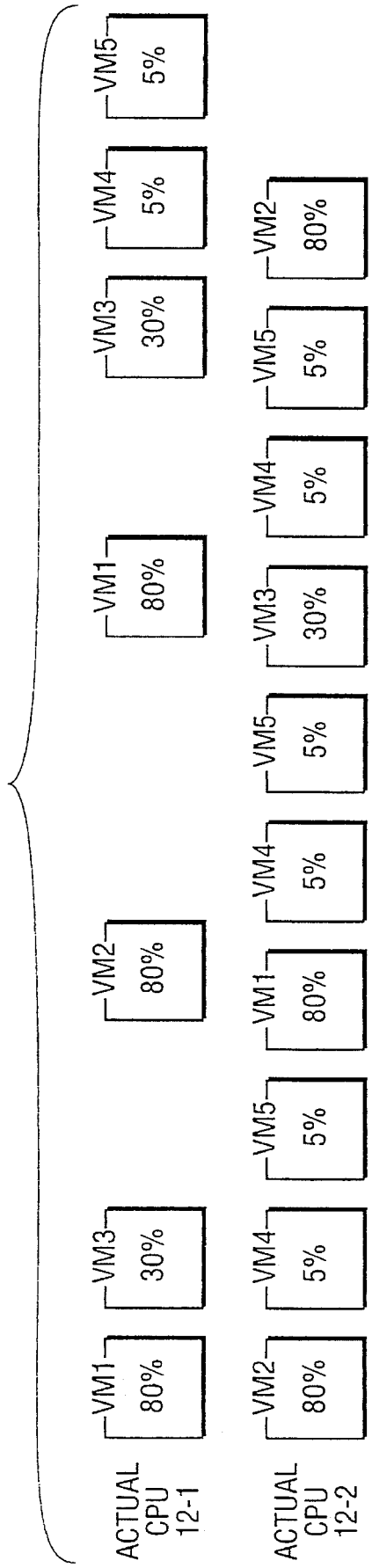
FIG. 6 shows a conventional unequal assignment using a plurality of actual CPUs.
Figures 7, 8:
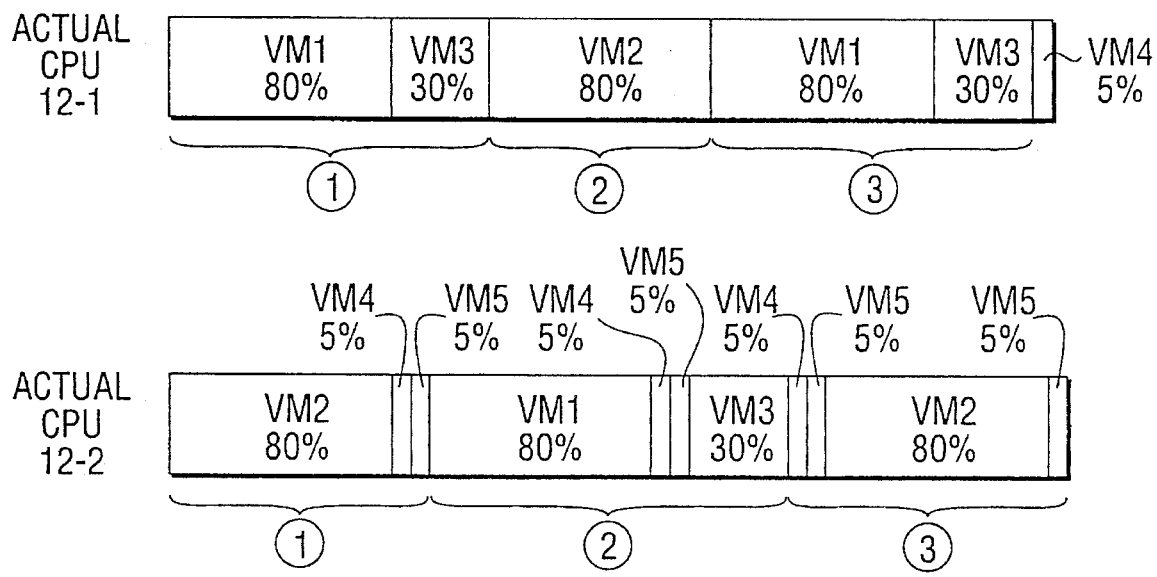
FIG. 7 shows the unequal assignment shown in FIG. 6 in the representation of CPU assignment time.
FIG. 8 shows the actual assignment of the CPU compared with a predetermined assignment when the unequal CPU assignment shown in FIG. 6 is repeatedly performed to reach a saturation state.
Figure 9:
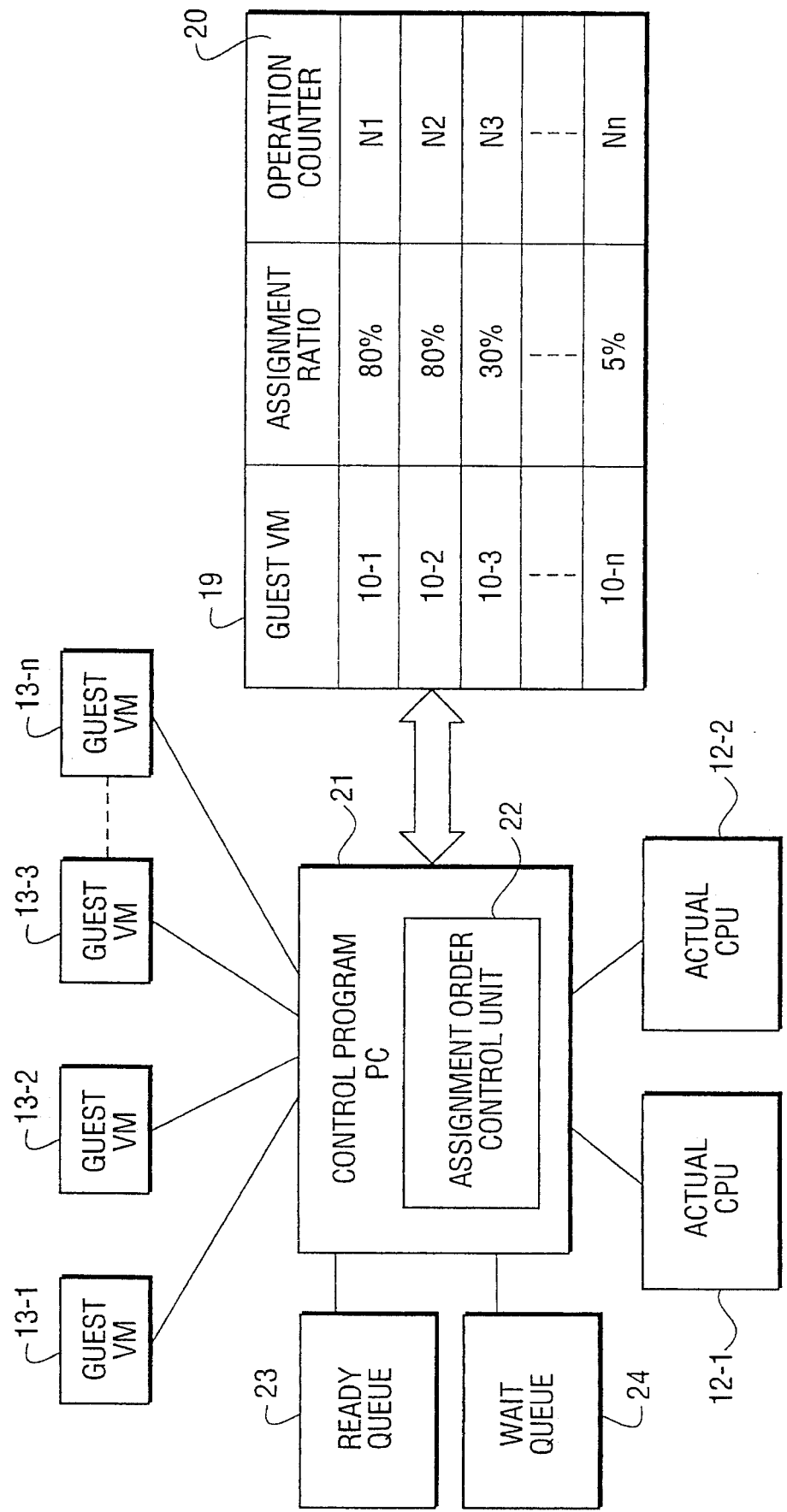
FIG. 9 shows the principle of the present invention.

FIG. 9 shows the principle of the present invention.

First, the present invention comprises an actual computer having two actual CPUs 12-1 and 12-2, the control program (CP) 21 for operating a plurality of guest VMs (virtual computers) 13-1 through 13-n, the CPU process control block (PCB) i.e. CPU assignment information area 19 for storing CPU resource assignment ratios determined according to the running time of actual CPUs 12-1 and 12-2 to be assigned, and the ready queue 23 in which pointer information indicating the correspondence to the CPU process control block 19 is prepared in high-to-low order of CPU resource assignment ratio for guest VM13-1 through VM13-n. With the configuration, the control program 21 assigns actual CPUs 12-1 and 12-2 to guest VM13-1 through VM13-n in the order specified by the pointer information of the ready queue 23, and the assigning process is repeatedly performed according to assignment ratios listed in the CPU process control block 19.

To realizing the above described method of controlling the CPU of a virtual computer system, the present invention further comprises an operation counter 20, provided in the CPU assignment information area 19, for counting the number of times of CPU assignment to each of the guest VM13-1 through VM13-n, and an assigning order control unit 22, provided in the control program 21, for determining the order of assigning CPU resources to guest VM13-1 through VM13-n in the ready queue 23 in order of number of times of operations indicated by the operation counter 20. When a plurality of guests have the same number of times indicated by the operation counter 20, one having a larger assignment ratio is assigned a CPU earlier. If the counter 20 indicates different numbers of times for guests 13-1 through 13-n, one having a smaller number of times is assigned the CPU earlier.

Furthermore, the control program 21 comprises a wait queue 24 for adding pointer information pointing to the CPU assignment information area 19 in virtual computer 13-i if it is in a waiting state when the CPU resources are assigned. The control program 21 removes the pointer information on guest VM13-i in the wait queue 24 when it becomes operative, and queues the guest in the ready queue 23.

If the control program 21 detects that virtual computer 13-i is in a waiting state during the CPU resource assignment, the unused resources (remaining time) assigned to the waiting guest are stored in the corresponding position in the CPU assignment information area 19, and the pointer information pointing to the CPU assignment information area 19 is put in the wait queue 24. When the control program 21 detects that the waiting virtual computer 13-i becomes operative, it removes the pointer information from the wait queue 24, moves it to the position in the ready queue 23 according to the number of times of operations indicated by the operation counter 20 and according to the priority based on an assignment ratio. Thus, the assignment of the CPU resources is started again.

On the other hand, the assigning order control unit 22 in the control program 21 compares the number of times of operations indicated by the operation counter 20 with the assignment ratio of each of the guest VM13-1 through VM13-n each time the CPU resources are assigned to a specific virtual computer 13-i. A plurality of guest VMs having the same number of times of operations are arranged in high-to-low order of assignment ratio. If the number of times of operations are different, the guest VMs are arranged in order of number of times of operations and, among them, in high-to-low order of assignment ratio.

The operation counter 20 counts up by one each time guest VM13-1 through VM13-n run for the time determined according to a CPU source assignment ratio. The pointer information indicating guest VMs whose operations have terminated is put in the ready queue 23 according to the control of the assigning order control unit 22.

Furthermore, the ready queue 23 stores head pointer information indicating the CPU assignment information area 19 of a guest VM having the current highest priority and the end pointer information indicating the CPU assignment information area 19 of the guest VM having the current lowest priority. Each time the CPU resources are assigned to a guest VM according to its assignment ratio, another guest VM specified by the head pointer information is assigned the CPU resources, and the ready queue is rearranged including the pointer information pointing the guest VM just assigned the CPU. At this time, the pointer information just assigned the CPU is removed from the ready queue 23.

With the above described configuration, the method of controlling the CPU of a virtual computer according to the present invention is designed such that the order of assigning the CPU is determined according to both the number of times of operating a guest VM and an assignment ratio although a predetermined assignment (ratio) of the CPU resources to a plurality of guest VMs is on an unequal basis. Therefore, the initial assignment order can be exactly maintained even after the repetition of the CPU assignment, and the CPU can be actually assigned according to a predetermined assignment ratio even though a plurality of actual CPUs are available. Thus, actual CPUs can be efficiently utilized.

For example, although a guest VM having a low assignment ratio is assigned higher priority and a guest VM having a high assignment rate is assigned lower priority as the CPU assignment is repeatedly performed, a guest VM indicating a smaller number of times of operations is selected for the next operation. Therefore, all guest VMs indicating the same number of times of operations must be assigned the CPU resources before starting the CPU assignment to those indicating a larger number of times of operations. Thus, the present invention prevents guest VMs having lower assignment ratios from receiving a larger number of times of operations than those having higher assignment ratios.

Even if the CPU assignment is unequally performed on guest VMs temporarily due to a waiting state allocated for some guest VMs during CPU assignment, they are assigned priority according to both the number of times of operations and an assignment ratio. Therefore, the temporary inequality is removed later in assigning CPU resources, and a predetermined assignment ratio can be exactly maintained.

Figure 10:
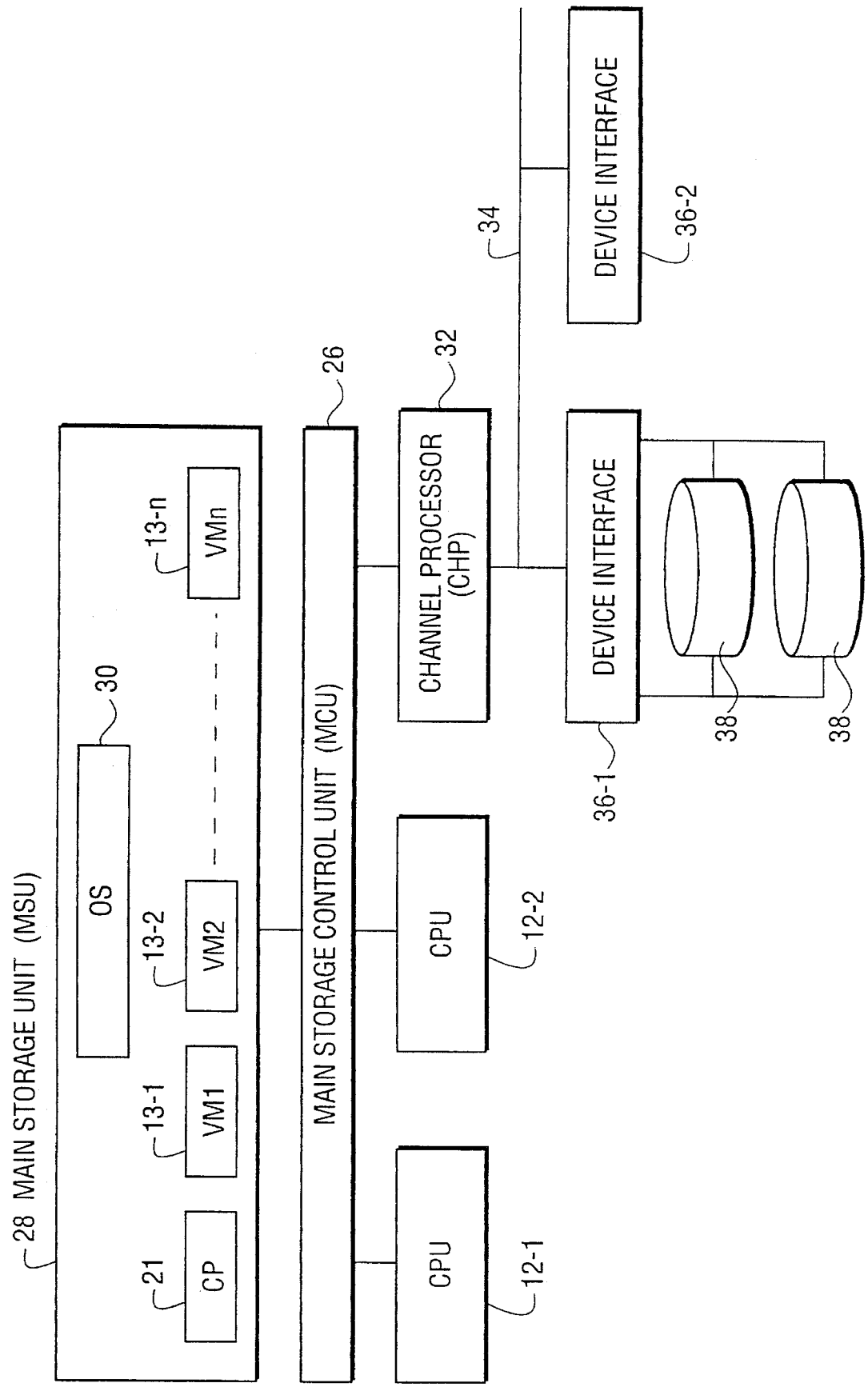
FIG. 10 shows the configuration of the hardware according to the present invention.

FIG. 10 shows a hardware configuration applied to a CPU control system of a virtual computer according to the present invention.

In FIG. 10, CPUs 12-1 and 12-2 (also referred to as actual CPUs) form an actual computer, and are connected to a main storage unit (MSU) 28 through a main storage control unit (MCU) 26. The main storage unit 28 is provided with an operating system (OS) 30 or running in actual computers 12-1 and 12-2 to realize an actual computer system.

The main storage unit 28 is also provided with the control program (CP) 21 for functioning as a VM monitor so as to realize a virtual computer system. The control program 21 makes guest VMs 13-1, 13-2, . . . , 13-n operative. All these guests are virtual computers in an actual computer system. Each of the guest VM13-1 through VM13-n made operative by the control program 21 can run its own operating system 30. The CPU assignment information area 19, the ready queue 23, and the wait queue 24 shown in FIG. 9 are provided in appropriate areas in the main storage unit 28.

A device bus 34 is connected to the main storage control unit 26 through a channel processor (CHP) 32, and the device bus 34 is provided with a plurality of device interfaces 36-1 and 36-2. In the present embodiment, a magnetic disk unit 38 is connected to device interface 36-1.

Figure 11:
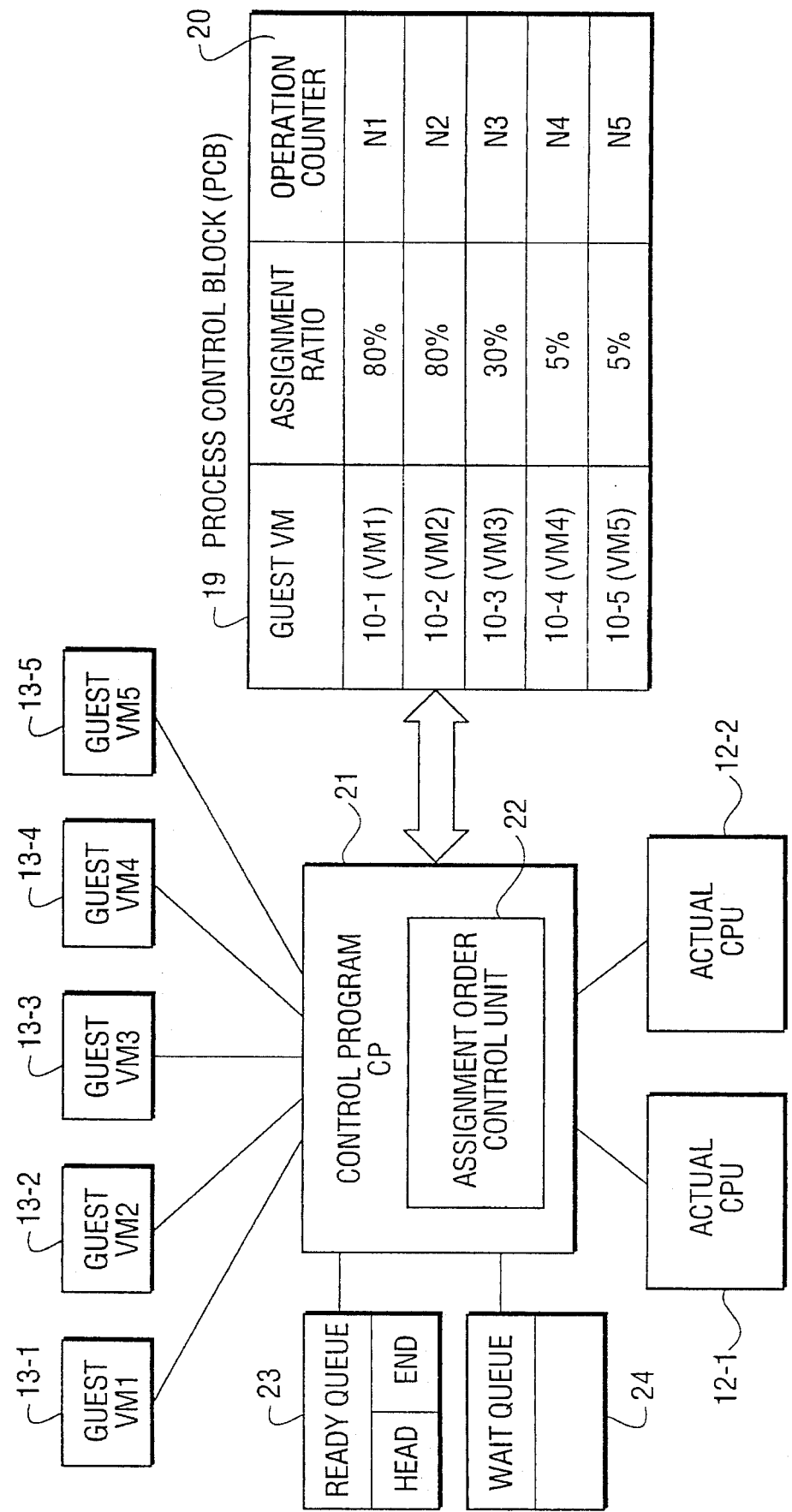
FIG. 11 shows an embodiment of a system for assigning CPU resources according to the present invention.

FIG. 11 shows an example of a virtual computer system according to the present invention embodied by the hardware configuration shown in FIG. 10.

In FIG. 11, five guest VM13-1 through VM13-5 can be operated and realized in a virtual computer system by the control program 21.

The control program 21 is provided with the process control block (PCB) 19 as a CPU assignment information area.

The process control block 19 has a CPU assignment ratio predetermined corresponding to the name of a guest VM, and is provided with the operation counter 20 according to the present invention.

Guests VM 13-1 through 13-5 are indicated as VM1 through VM5 to simplify the explanation. A CPU assignment ratio is represented by %. The assignment of CPU resources based on a CPU assignment ratio actually refers to the time assignment of actual CPU 12-1 or 12-2.

The operation counter 20 stores a one-count-up value as the number of times of operations each time one operation is performed according to a CPU (actual CPU12-1 or CPU12-2) resource assignment ratio predetermined for each of the guest VM13-1 through VM13-5. In the present embodiment, the numbers of times of operations performed on guest VM13-1 through VM13-5 are indicated as the numbers N1–N5 of times of operations indicated by the operation counter 20.

Furthermore, the control program 21 is provided with the ready queue 23 and the wait queue 24.

The ready queue 23 stores information on guest VM13-1 through VM13-5 in the CPU resource assigning order determined by the assignment order control unit 22 provided in the control program 21. Actually, the ready queue 23 stores pointer information pointing to an area in the process control block 19 for each of the guest VM13-1 through VM13-5. The pointer information can be accessed both backward and forward.

The assignment order for each of the guest VM13-1 through VM13-5 can be determined by the assignment order control unit 22 according to the following rules 1 and 2.

[Rule 1] a guest VM (VM13-1 through VM13-5) having a smaller number (N1 through N5) of times of operations indicated by the operation counter is selected first for the next operation.

[Rule 2] Guest VM13-1 through VM13-5 are arranged in high-to-low order of assignment ratio.

Since rule 1 has priority over rule 2 in determining an assignment order, rule 1 is satisfied before rule 2. Actually, if a plurality of guest VMs indicate the same number N1–N5 of times of operations, the pointer information is given in the ready queue 23 in high-to-low order of assignment ratio.

If guest VM13-1 through VM13-5 indicate different numbers of times of operations N1 through N5 indicated by the operation counter 20, for example, if a guest VM indicates a smaller number of times of operations than another one, then the former has priority over the latter when assigned CPU resources and is put at the head position in the ready queue 23.

In practice, the ready queue 23 stores head pointer information on the current leading guest VM and end pointer information on the current trailing guest VM according to CPU assignment orders of guest VM1 through VM5 determined by the assignment order control unit 22 based on rules 1 and 2.

However, when CPU resources are assigned to a guest VM specified by the head pointer information, the pointer information is removed from the ready queue 23, and the pointer information specifying the second highest order guest VM is moved to the head position. Thus, each time the CPU resources are assigned to one guest VM, the ready queue 23 is rearranged including the pointer information on the guest VM just assigned the CPU resources.

In many cases, the rearrangement is completed simply by adding the pointer information on the VM just assigned the CPU resources to the end of the end pointer information. However, if guest VMs indicating the same number of times of operations are arranged in a complicated order, then the whole information is checked backward from the end pointer information so as to position the pointer information on the guest VMs just assigned the CPU resources after the pointer information on the guest VMs in order of number of times of operations and in high-to-low order of assignment ratio. This is the reason why end pointer information is stored according to the present invention.

On the other hand, if a guest VM is in a waiting state when the control program 21 determines the CPU assignment order, then the pointer information on the waiting guest VM is removed from the position of the head pointer in the ready queue 23 and added to the wait queue 24.

By adding the point information to the wait queue 24, a guest VM having the next higher priority is assigned the CPU resources. It is obvious that pointer information on a plurality of guest VMs can be added to the wait queue 24, and the meaning area for the maximum of 5 guest VM13-1 through VM13-5 is sufficient.

After adding the pointer information on a waiting guest VM to the wait queue 24, the control program 21 constantly monitors whether or not the waiting guest VM has turned operative. If the waiting guest VM has turned operative, the control program 21 removes the pointer information on the guest VM from the wait queue 24, and positions the removed pointer information to a priority position in the ready queue 23 according to rules 1 and 2 of the assignment order control unit 22.

On the other hand, if a guest VM is assigned CPU resources but has fallen into a waiting state during the assignment, the control program 21 adds the pointer information on the guest VM to the wait queue 24, and operates such that the assignment ratio of the guest VM listed in the process control block 19 is reserved as a remaining assignment ratio.

Therefore, if a waiting guest VM is assigned CPU resources after it has turned operative, added to the ready queue 23, and assigned CPU resources, then it is assigned the resources for the remaining ratio.

Figure 12:
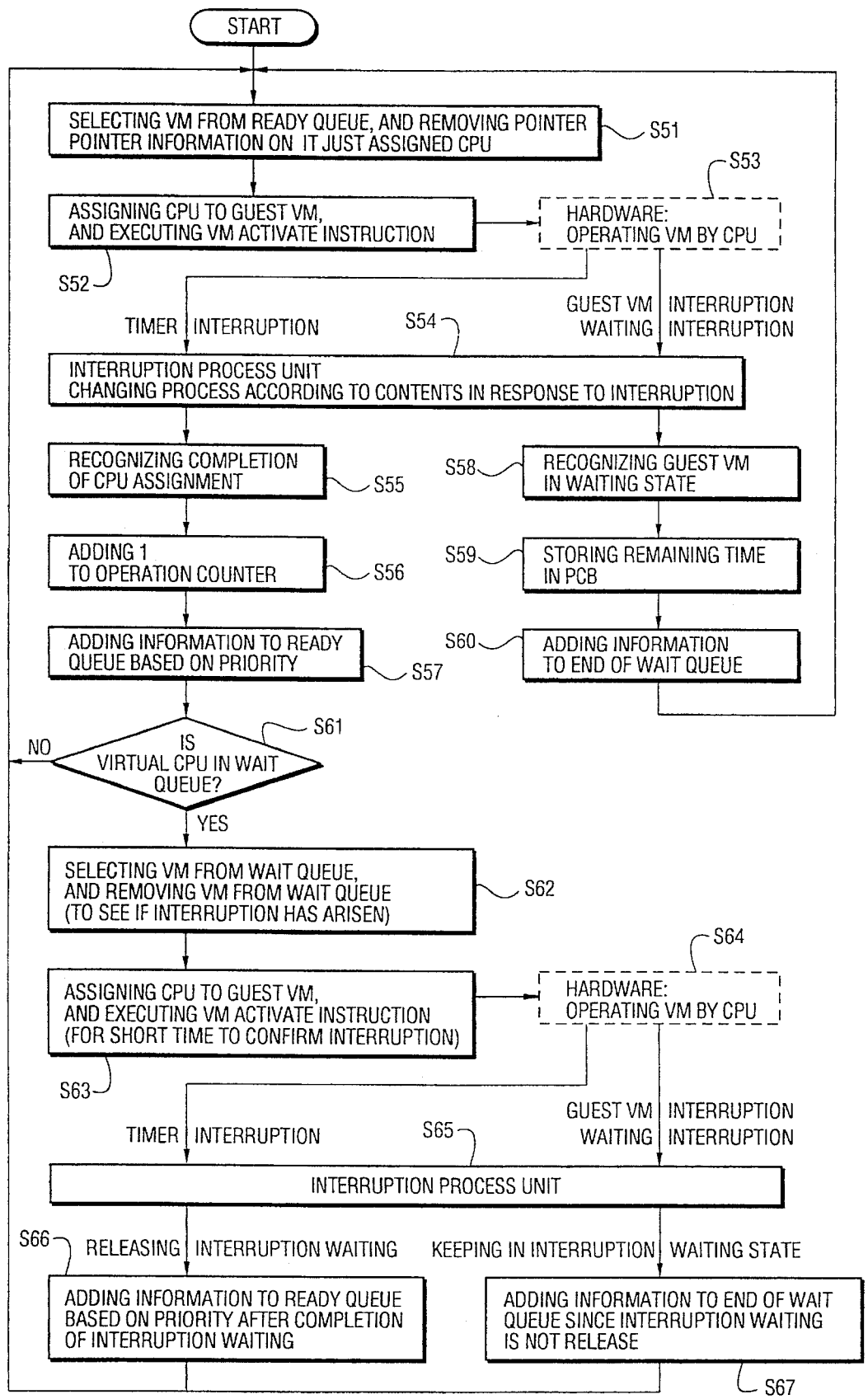
FIG. 12 is a flowchart showing the process of assigning CPU resources according to the present invention.

FIG. 12 is a flowchart for explaining the CPU assigning process in the virtual computer shown in FIG. 11.

In FIG. 12, a guest VM is selected by the assignment order control unit 22 in step S51. For example, the assignment order control unit 22 checks the numbers of times of operations N1–N5 indicated by the operation counter 20 in the process control block 19 and assignment ratios in step 57 or 66 described later, determines the assignment order for guest VM13-1 through VM13-5, adds the pointer information on the leading and trailing guest VMs to the ready queue 23, selects a guest VM to be assigned CPU resources by reading the head pointer information in the ready queue 23, and simultaneously removes the pointer information on the guest VM from the ready queue 23.

Then, in step S52, a VM activate instruction is executed on the CPU assigned guest VM, and the guest VM is operated by the CPU as hardware in step S53. The operation performed by the guest VM by the hardware cannot be directly viewed by the assignment order control unit 22. The assignment order control unit 22 knows the operation state of the guest VM only by the reception (S54) of the interruption to an internal interruption process unit.

Assuming that the interruption processing unit receives a timer interruption in step S54, the timer interruption is carried out when the assignments of CPU resources to all the guest VMs are released. Then, at the interruption, the assignment order control unit 22 recognizes that the CPU has been duly assigned in step S55, steps up the value indicated by the operation counter 20 for the guest VM in step S56, adds the pointer information on the guest VM just assigned the CPU to the ready queue 23 based on a predetermined priority in step S57, and rearranges the ready queue 23.

On the other hand, if the interruption process unit receives a guest VM interruption waiting interruption, then a different process is performed in step S54. The guest VM interruption waiting interruption indicates that the CPU assigned guest VM has fallen in a waiting state, for example, that the guest VM issues an I/O demand, the I/O operation is performed, and an interruption indicating the end of an input/output operation is completed is being expected. It indicates that the CPU is actually stopped in the remaining CPU available time.

In this case, the assignment order control unit 22 recognizes a waiting state of a guest VM in step S58, stores the remaining time in the column of assignment ratio in the CPU assignment information area 19 for the corresponding guest VM in step S59, and adds the pointer information on the guest VM to, for example, the end of the wait queue 24 in step S60. The CPU assigned to the guest VM is released, and the assignment order control unit 22 selects from the ready queue 23 a guest VM having the next higher priority back in step S51, and then the above described processes are performed.

On the other hand, if pointer information on a guest VM just assigned CPU resources in step S57 is added to the ready queue 23, then it is determined whether or not the wait queue 24 has stored pointer information on a virtual CPU, that is, a guest VM, in step S61. If no, the processes starting from step S51 are repeated.

If pointer information is added to the wait queue 24 in step S61, then pointer information is selected from the wait queue in step S62 to check whether or not an interruption indicating the removal of the waiting state of the guest VM specified by the pointer information has arisen, and the pointer information is removed. In step S63, the CPU is assigned to a guest VM for a necessary time, and a VM activate instruction is executed to confirm whether or not the expected interruption has arisen. In step S64, the guest VM is operated by the CPU as hardware.

In step S65 as well as in steps S53 and S54, an interruption to the interruption process unit informs of whether or not the waiting state of a guest VM is released. If it is a timer interruption, it is indicated that a guest TV interruption waiting timer indicates timeout, that is, the interruption waiting is released. At this time, the interruption process unit determines in step S65 that the interruption waiting is released, and adds the pointer information on the guest VM to the ready queue 23 based on priority in step S66 as in step S57. Then, the processes from step S51 are repeatedly performed.

If a guest VM interruption waiting interruption has arisen at the interruption processing unit in step S65, then the guest VM is kept in an interruption waiting state. Then, in step S67, the pointer information on the guest VM is added to, for example, the end of the wait queue, and the processes from step S51 are repeatedly performed.

Figure 13:
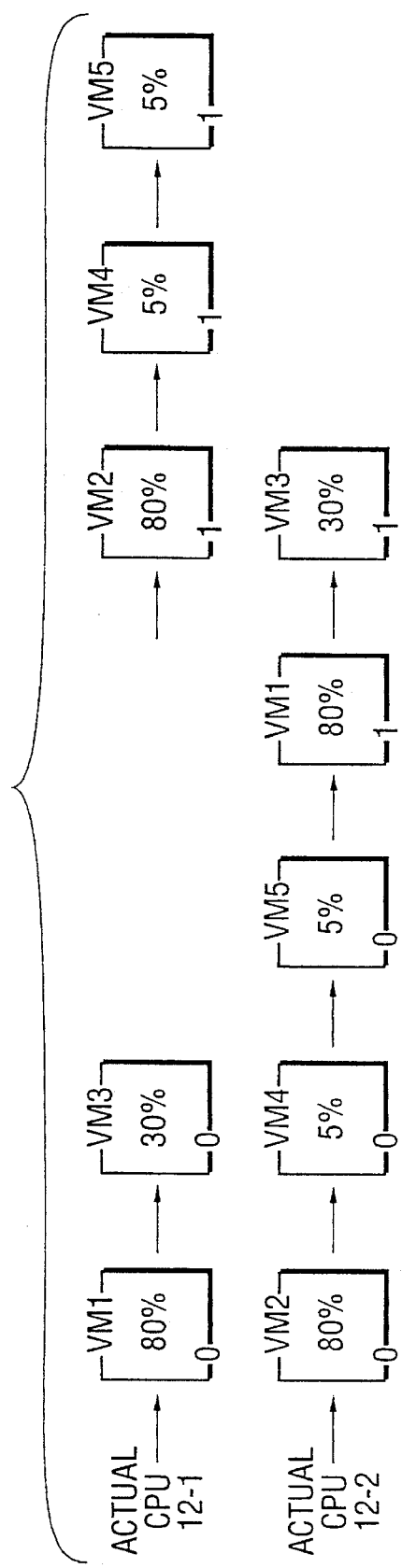
FIG. 13 shows the assignment order based on an unequal assignment ratios according to the present invention.
Figure 14:
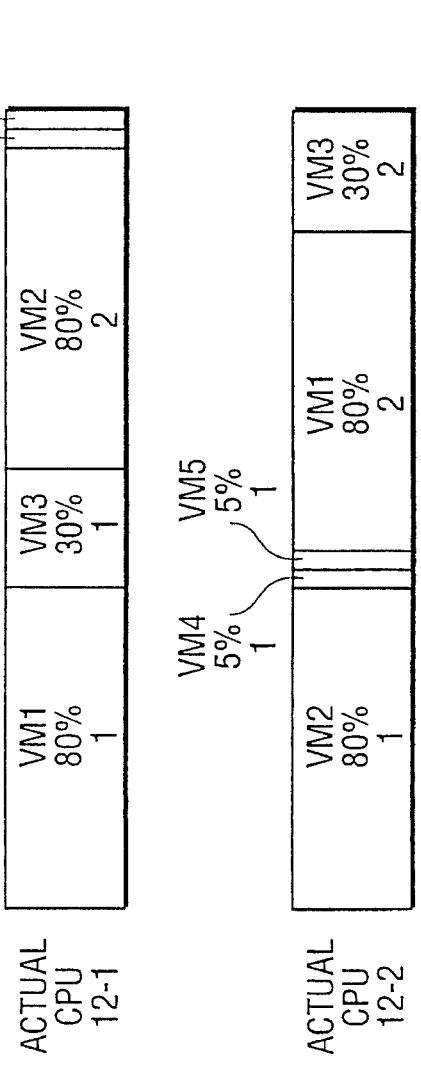
FIG. 14 shows the CPU assignment shown in FIG. 13 in the representation of CPU assignment time.

FIG. 13 shows the CPU assignment order according to the present invention embodied as shown in FIG. 11. FIG. 14 shows the CPU assignment of FIG. 13 as represented by CPU assignment time.

The CPU assignment shown in FIG. 13 indicates guest VM13-1 through VM13-5 as VM1 through VM5 for simplification, and are assigned the following CPU assignment ratios individually.

|     |     |
| --- | --- |
| VM1 | 80% |
| VM2 | 80% |
| VM3 | 30% |
| VM4 | 5%  |
| VM5 | 5%  |

Figure 15:
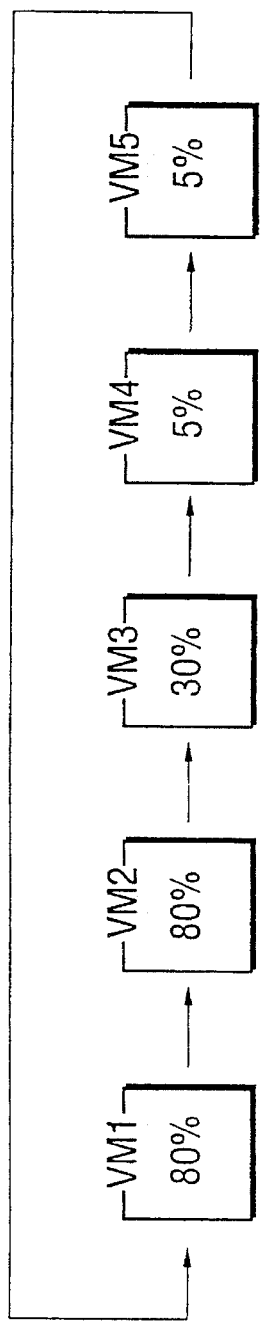
FIG. 15 shows the CPU assignment order when all guest VMs are operative.

At the initial state, the operation counter 20 sets the numbers of times of operations N1 through N5 for guest VM1 through VM5 to N1 through N5=0. Accordingly, the assignment order control unit 11 determines the assignment order according to rule 2. That is, guest VM1 through VM5 are arranged in high-to-low order of assignment ratio as shown in FIG. 15 based on the assignment ratios of guest VM1 through VM5.

In the first CPU assignment cycle, actual CPU 12-1 is assigned to guest VM1 having the highest priority, while actual CPU 12-2 is assigned to guest VM2 having the second highest priority. The assignments start simultaneously for guest VM1 and VM2. Since the same assignment ratio 80% is given to guest VM1 and VM2, the processes of assigning actual CPUs 12-1 and 12-2 to guest VM1 and VM2 are released simultaneously as clearly shown in FIG. 14.

Next, actual CPU12-1 is assigned to guest VM3 having the third highest priority, and simultaneously, actual CPU12-2 is assigned to guest VM4 having the fourth highest priority. These assignments start at the same time.

Since actual CPU12-2 is assigned to guest VM4 having a smaller assignment ratio of 5%, the assignment is released earlier than the assignment of actual CPU12-1 to guest VM3 having the assignment ratio of 30%. When the assignment to guest VM4 is released, actual CPU12-2 is assigned to guest VM5, and the assignment is reserved. The process for guest VM3 still continues when the assignment to guest VM5 is released.

Therefore, actual CPU12-2 is assigned to guest VM1 again when the assignment to guest VM5 is released, and the second assignment starts for guest VM1. During the assignment to guest VM1, the first assignment to guest VM3 is released.

Each time the assignment is released from guest VM1 through VM5, the numbers of times of operations N1 through N5 are stepped up by one, and the assignment order control unit 22 determines the assignment order based on the priority of the guest VMs and according to rules 1 and 2 when the next CPU assignment is started.

Accordingly, even if the assignment to guest VM4 and VM5 is released before the assignment to guest VM 3 in the first CPU assignment cycle, the numbers of times of operations N1 thorough N5 indicated by the operation counter 20 match when the first assignment cycle to all guest VM1 through VM5 are released with the assignment to guest VM3 finally released. Now that all the numbers of times of operations N1 through N5 indicated by the operation counter 20 have matched, guest VMs are arranged in high-to-low order of assignment ratio according to rule 2. Therefore, when the second CPU assignment cycle is started, the assignment order for guest VM1 through VM5 are kept the same as in the first CPU assignment cycle as shown in FIG. 15.

Consequently, the assignment ratios specified by the process control block 19 can be maintained even after the repetition of assignments. Thus, actual CPU12-1 and 12-2 can be efficiently utilized.

Figure 16A:
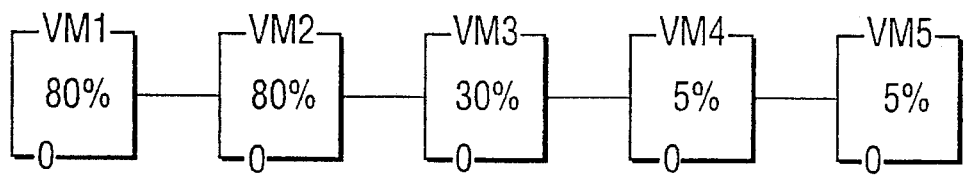
FIGS. 16A–16E show the contents of the ready queue corresponding to FIG. 13.

FIG. 16A–16E show the contents of the ready queue 23 corresponding to FIG. 13. FIG. 16A shows the contents of the ready queue at the initialization. The ready queue contains the pointer information on guest VM1 through VM5. Actually, the pointer information is represented by the contents of the PCB area specified by pointers.

Figure 16B:
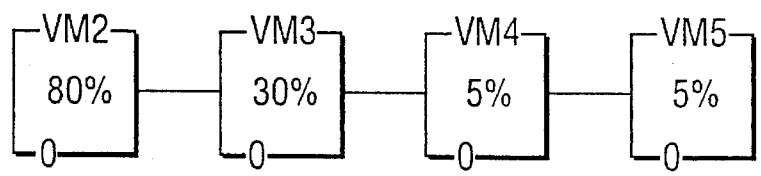
Figure 16C:
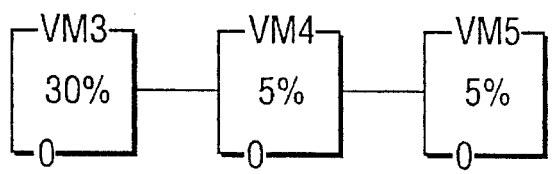

FIG. 16B shows the contents of the ready queue immediately after actual CPU12-1 has been assigned to guest VM1. At this time, since actual CPU12-2 is not assigned to any guest VM, the pointer information on guest VM2 is positioned at the head of the ready queue. FIG. 16C shows the state immediately after CPU 12-2 has been assigned to guest VM2. At this time, the pointer information on guest VM3 is positioned at the head of the ready queue.

Figure 16D:
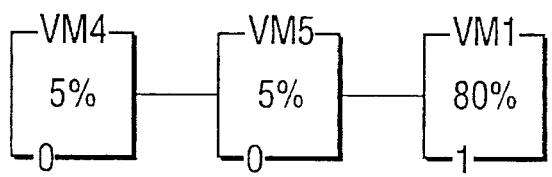
Figure 16E:
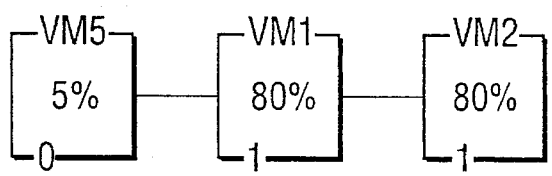

FIG. 16D shows the contents of the ready queue immediately after the CPU 12-1 has been assigned to guest VM3 after the assignment of CPU 12-1 to guest VM1 has been released. The counter value indicates "1" for guest VM1 which has released the CPU, and the pointer information for guest VM1 is added to the end of the ready queue 23. FIG. 16E shows the contents of the ready queue immediately after the CPU 12-2 has been assigned to guest VM4 after the assignment of CPU 12-2 to guest VM2 has been released. The counter value indicates "1" for guest VM2 which has released the CPU 12-2, and the pointer information for guest VM2 is added to the end of the ready queue 23.

Figure 17:
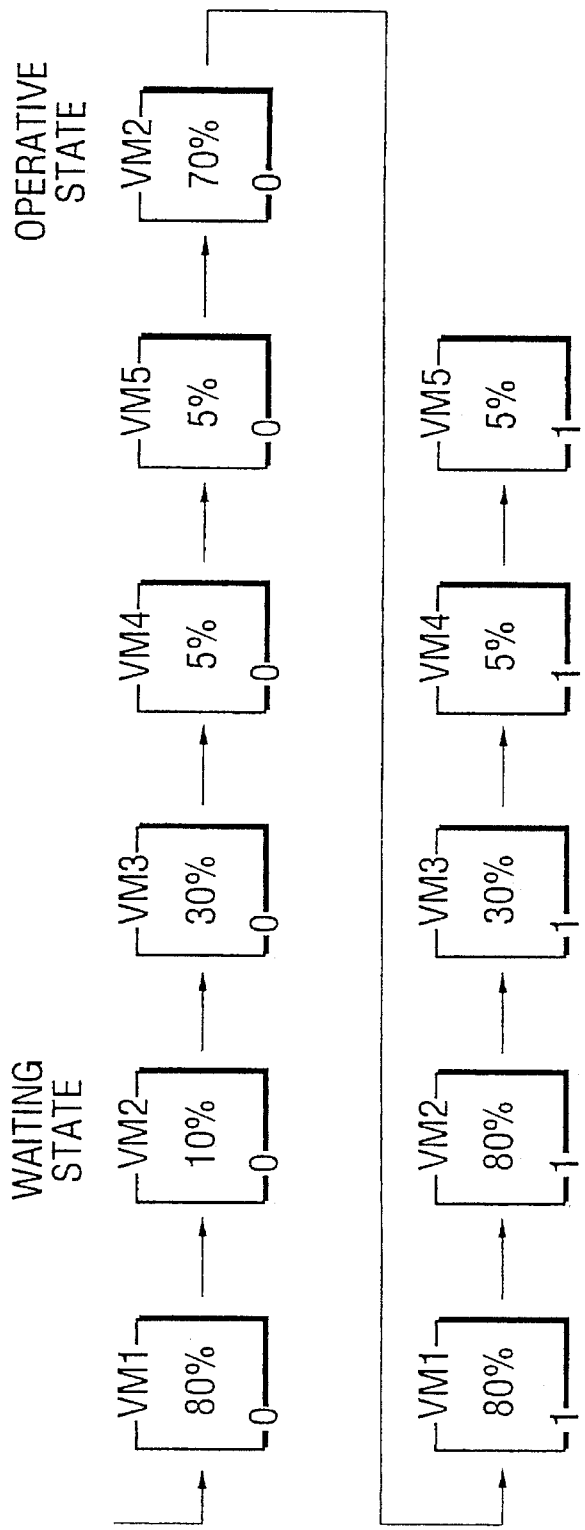
FIG. 17 shows the assignment process in which a guest VM has fallen into a waiting state during the assignment.

FIG. 17 shows a waiting state arising in guest VM2 during the assignment of guest VM1 through VM5.

Assume that, in FIG. 17, guest VM2 has fallen in a waiting state after the time equivalent to the assignment ratio of 10% has passed while the CPUs are assigned to guest VM1 through VM5 in this order in the first assignment cycle to all the guest VMs. When guest VM2 is thus in a waiting state, the pointer information on guest VM2 is added to the wait queue 24, and the assignment ratio of guest VM2 is set to the remaining assignment ratio of 70% in the control process block 19.

When guest VM2 is transferred to a waiting state, the next guest virtual machine VM3 is assigned CPU resources. If the waiting guest VM2 has turned operative after guest VM5 has been assigned a CPU in the first assignment cycle, then the pointer information on guest VM2 is taken out of the wait queue 24 and added to the ready queue 23.

At this time, the ready queue stores the pointer of guest VM1 and VM3 through VM5 all waiting for the second CPU assignment after terminating their first assignments. Since the number N2 of times of operations for the waiting guest VM2 indicates "0" which is smaller than the numbers of times N1 and N3 through N5=1 for guest VM1 and VM3 through VM5, guest VM2 has priority over the other guest VMs, and its remaining assignment ratio of 70% is performed first.

Accordingly, after CPU resources are assigned to guest VM2 after a waiting state in the first assignment cycle, the second assignment cycle starts because all the numbers N1 through N5 of times of operations indicate "1". Therefore, in the second assignment cycle, guest VMs are assigned CPU resources in high-to-low order of assignment ratio. Thus, the order shown in FIG. 15 can be maintained.

As described above, even if a predetermined assignment order is temporarily dishonored by keeping a guest VM in a waiting state, the predetermined order can be maintained at the start of the next assignment cycle.

The above described embodiment is explained such that two actual CPUs are assigned to five guest VMs. However, the present invention is not limited to this application, and any actual CPUs can be assigned to any guest VMs.

Thus, according to the present invention, a plurality of actual CPUs can be assigned to a plurality of guest VMs based on an assignment ratio predetermined for each of the guest VMs by assigning them in a predetermined order maintained by using the number of times of operations indicated by the operation counter which counts up by one each time CPU resources are assigned in a predetermined order. Thus, a virtual computer system can be operated with its actual CPU efficiently assigned.

Furthermore, since a guest put in a waiting state before fully assigned necessary CPU resources can be repositioned in a predetermined sequence at the start of the next assignment cycle, the actual CPU resources can be effectively utilized without dishonoring by a waiting state of a guest VM a predetermined order of all guest VMs.

The present invention is applicable in all fields of industries where virtual computer systems are used not limited to organizations associated with computers and information processing activities.

What is claimed is:

1. A central processing unit control system for use in a virtual computer system having an actual computer comprising a plurality of actual central processing units, a control program for operating a plurality of virtual computers in said actual computer, a central processing unit assignment information area for storing a central processing unit resource assignment ratio of each of said virtual computers on the basis of running time of said actual central processing units to be assigned, and a ready queue for storing pointer information on said virtual computers, each piece of said pointer information indicating the correspondence to said central processing unit assignment information area in priority order of central processing unit resource assignment for said virtual computers, wherein said control program assigns said actual central processing units to said virtual computers according to the order specified by said pointer information in said ready queue, and each of said virtual computers is repeatedly operated according to a predetermined assignment ratio indicated in said central processing unit assignment information area, said central processing unit control system comprising:

operation counter means, provided in said central processing unit assignment information area, for storing, for each of said virtual computers, the number of successful assigning operations according to a predetermined central processing unit resource assignment ratio; and assignment order control means, provided in said control program, for checking the number of the successful assigning operations of each virtual computer stored by said operation counter means and the central processing unit resource assignment ratio for each virtual computer each time the central processing unit resource is assigned, arranging the pointer information on said ready queue in order from a largest central processing unit resource assignment ratio to the smallest central processing unit resource assignment ratio when the numbers of successful assigning operations are same for each virtual computer, and arranging, when the number of successful assigning operations are not the same for each virtual computer, the pointer information on said ready queue in order from a first group to a last group, where the first group contains virtual computers having the highest central processing unit resource assignment ratio and being the same for each virtual computer in the group, and the last group contains virtual computers having the lowest central processing unit resource assignment ratio and being the same for each virtual computer in the group, groups existing between the first group and the last group having successively lower central processing unit resource assignment ratios and each virtual computer in each group having the same central processing unit resource assignment ratio as the other virtual computers in the group.

2. The central processing unit control system according to claim 1, wherein, said control program comprises interruption process means for accepting an interruption from said actual central processing units, and said interruption process means detects the end of central processing unit resource assignment to said specific virtual computer by a timer interruption indicating that the running time of said actual central processing unit determined by said central processing unit resource assignment ratio has passed.

3. The central processing unit control system according to claim 1, wherein the number of times of operations indicated by said operation counter means is counted up by one each time said virtual computers are operated for the time determined by said central processing unit resource assignment ratio.

4. The central processing unit control system according to claim 1, wherein said ready queue stores head pointer information indicating the central processing unit assignment information area of the virtual computer having the currently highest priority and end pointer information indicating the central processing unit assignment information area of the virtual computer having the currently lowest priority.

5. The central processing unit control system according to claim 1, wherein said control program removes from said ready queue the pointer information indicating said central processing unit assignment information area of a virtual computer actually assigned central processing unit resources, and said ready queue stores the pointer information indicating a virtual computer currently not assigned central processing unit resources.

6. The central processing unit control system according to claim 1 further comprising:

a wait queue for storing pointer information indicating said central processing unit assignment information area of a virtual computer held in a waiting state at the start of central processing unit resource assignment, wherein said control program removes the pointer information in said wait queue if said virtual computer has turned operative, and adds it to said ready queue.

7. The central processing unit control system according to claim 1 further comprising:

a wait queue for storing pointer information indicating said central processing unit assignment information area of a virtual computer held in a waiting state during central processing unit resource assignment, wherein said control program controls such that the remaining assignment ratio of said waiting virtual computer is stored at the corresponding position in said central processing unit assignment information area and the pointer information indicating the corresponding central processing unit assignment information area is added to said wait queue when said control program detects that said virtual computer has fallen in a waiting state during central processing unit resource assignment, and said control program controls such that, when it detects that a waiting virtual computer has turned operative, the central processing unit resource assignment can be resumed by removing the pointer information from said wait queue and adding it to the position in said ready queue according to the priority determined by the number of times of operations indicated by said operation counter and a predetermined assignment ratio.

8. The central processing unit control system according to claim 7, wherein said control program comprises an interruption process means for accepting an interruption from said central processing units, and said interruption process means detects that said virtual computer has fallen in a waiting state during central processing unit resource assignment by receiving a guest VM interruption waiting interruption informing that said virtual computer has fallen in an interruption-waiting state.

9. The central processing unit control system according to claim 1 further comprising:

a wait queue for receiving pointer information indicating said central processing unit assignment information area of said virtual computer which has fallen in a wait state at the start of or during said central processing unit resource assignment, and an interruption process means, provided in said control program, for accepting an interruption from said actual central processing units, wherein said assignment order control means rearranges said pointer information in said ready queue each time central processing unit resources are assigned to a specific virtual computer of said virtual computers, said control program removes pointer information from said wait queue if it is added to said wait queue, a VM activate instruction is executed after an actual central processing unit is assigned to a virtual computer specified by said pointer information, pointer information is rearranged in said ready queue including said removed pointer information when said interruption process means detects a timer interruption indicating that a waiting time of said waiting virtual computer has passed, said removed pointer information is added again to said wait queue when said interruption process means detects a guest VM waiting interruption indicating that said waiting virtual computer has not yet turned operative.

10. A control system for use with a central processing unit, where a plurality of virtual computers each has a corresponding assignment ratio and, in accordance with a priority order of the virtual computers, is sequentially assignable to the central processing unit for processing by the central processing unit, the control system comprising:

a first mechanism arranging the priority order of the virtual computers so that, when the number of times each virtual computer has been assigned to the central processing unit is the same for each virtual computer, the priority order is in descending order from the virtual computer having a largest assignment ratio to the virtual computer having a smallest assignment ratio, and a second mechanism arranging the priority order of the virtual computers so that, when the number of times each virtual computer has been assigned to the central processing unit is not the same for each virtual computer, the priority order is in descending order from a first group of virtual computers having a highest assignment ratio which is the same for each virtual computer in the group, to a last group of virtual computers having a lowest assignment ratio which is the same for each virtual computer in the group, and wherein the virtual computers are assigned to the central processing unit for processing in accordance with the priority as arranged by the first mechanism and second mechanism.

11. The control system according to claim 10, wherein the assignment ratio corresponding to each virtual computer indicates the amount of processing time by the central processing unit allowed for the respective virtual computer when the respective virtual computer is assigned to the central processing unit, the control system further comprising:

interruption process means for ending processing by the central processing unit for a respective virtual computer assigned to the central processing unit, by detecting when the processing time indicated by the assignment ratio corresponding to the respective virtual computer has elapsed.

12. The control system according to claim 10, wherein the assignment ratio corresponding to each virtual computer indicates the amount of processing time by the central processing unit allowed for the respective virtual computer when the respective virtual computer is assigned to the central processing unit, the control system further comprising:

a counter which counts the number of times each virtual computer has been assigned to the central processing unit and supplies the number of times to the first and second mechanism for arranging the priority order, wherein the counter increases by one the number of times counted for a respective virtual computer each time the virtual computer is assigned to the central processing unit and processed by the central processing unit for the amount of processing time indicated by the corresponding assignment ratio.

13. The control system according to claim 10, further comprising:

an information area which stores the assignment ratios corresponding to the virtual computers; and a ready queue which includes a head pointer indicating a location in the information area at which the assignment ratio corresponding to the virtual computer having the highest priority in the priority order is stored, and an end pointer indicating a location in the information area at which the assignment ratio corresponding to the virtual computer having the lowest priority in the priority order is stored.

14. The control system according to claim 13, wherein, as the virtual computers are sequentially assigned to the central processing unit, the ready queue:

updates the head pointer to indicate a location in the information area at which the assignment ratio corresponding to the virtual computer having the currently highest priority in the priority order is stored, and updates to end pointer to indicate a location in the information area at which the assignment ratio corresponding to the last virtual computer assigned to the central processing unit, and thereby having the lowest priority in the priority order, is stored.

15. The control system according to claim 13, wherein a respective virtual computer enters a wait state when assignment of the respective virtual computer for processing by the central processing unit is to be delayed, the control system further comprising:

a wait queue which indicates locations in the information area at which the assignment ratios corresponding virtual computers in a wait state are stored; and a queue control mechanism which, when a respective virtual computer in a wait state exists the wait state, stops the wait queue from indicating a location in the information area at which the assignment ratio corresponding to the respective virtual computer is stored, and updates the ready queue so that the ready queue indicates a location in the information area at which the assignment ratio corresponding to the respective virtual computer is stored.

16. The central processing unit control system according to claim 15, further comprising:

a wait state updating mechanism which, when a respective virtual computer enters a wait state while assigned to the central processing unit for processing by the central processing unit, stores the remaining assignment ratio of the respective virtual computer in the information area at which the assignment ratio corresponding to the respective virtual computer is stored, and updates the wait queue to indicate the location in the information area at which the remaining assignment ratio was stored; and a ready queue update mechanism which, when a respective virtual computer in a wait state exits the wait state, updates the ready queue to indicate a location in the information area at which the assignment ratio corresponding to the respective virtual computer is stored, and stops the wait queue from indicating a location in the information area at which the assignment ratio corresponding to the respective virtual computer is stored, the ready queue being updated in accordance with the priority order as arranged by the first mechanism and the second mechanism.

17. The control system according to claim 16, wherein each virtual computer comprises an interrupt signal mechanism which, when the respective virtual computer enters a wait state while assigned to the central processing unit for processing by the central processing unit, produces an interrupt signal which causes the wait state updating mechanism to store the remaining assignment ratio of the respective virtual computer.

18. The control system according to claim 17, wherein:

a wait state last for a specific waiting period, and, when the specific waiting period elapses for a respective virtual computer in a wait state, the ready queue updates mechanism updates the ready queue.

19. A method for use with a central processing unit, where a plurality of virtual computers each has a corresponding assignment ratio and, in accordance with a priority order of the virtual computers, is sequentially assignable to the central processing unit for processing by the central processing unit, the method comprising:

arranging the priority order of the virtual computers so that, when the number of times each virtual computer has been assigned to the central processing unit is the same for each virtual computer, the priority order is in descending order from the virtual computer having a largest assignment ratio to the virtual computer having a smallest assignment ratio;

arranging the priority order of the virtual computer so that, when the number of times each virtual computer has been assigned to the central processing unit is not the same for each virtual computer, the priority order is in descending order from a first group of virtual computers having a highest assignment ratio which is the same for each virtual computer in the group, to a last group of virtual computers having a lower assignment ratio which the same for each virtual computer in the group; and assigning the virtual computers to the central processing unit for processing in accordance with the arranged priority order.

* * * * *

UNITED STATES PATENT AND TRADEMARK OFFICE
CERTIFICATE OF CORRECTION

PATENT NO.   : 5,530,860
DATED        : June 25, 1996
INVENTOR(S)  : Hidekazu MATSUURA It is certified that error appears in the above-indentified patent and that said Letters Patent is hereby corrected as shown below:

Column 3, line 13, please change "VMS" to correctly read --VM5--.

Column 11, line 45, please change "VMS" to correctly read --VM5--.

Signed and Sealed this

Fifteenth Day of October, 1996

Attest:

BRUCE LEHMAN

*Attesting Officer*  *Commissioner of Patents and Trademarks*